United States Patent
Ohno

(10) Patent No.: US 8,186,471 B2
(45) Date of Patent: May 29, 2012

(54) CONTROL APPARATUS AND CONTROL METHOD FOR HIGH VOLTAGE POWER SUPPLY CIRCUIT AND VEHICLE PROVIDED WITH CONTROL APPARATUS

(75) Inventor: Yoshikazu Ohno, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 40 days.

(21) Appl. No.: 12/545,936

(22) Filed: Aug. 24, 2009

(65) Prior Publication Data

US 2010/0044126 A1 Feb. 25, 2010

(30) Foreign Application Priority Data

Aug. 25, 2008 (JP) ................... 2008-215140
Dec. 17, 2008 (JP) ................... 2008-321293

(51) Int. Cl.
*B60R 21/00* (2006.01)
(52) U.S. Cl. ....... 180/274; 180/279; 180/65.8; 307/10.1
(58) Field of Classification Search .......... 180/271, 180/274, 279, 65.8; 307/10.1, 10.6, 10.7
See application file for complete search history.

(56) References Cited

U.S. PATENT DOCUMENTS

| | | | |
|---|---|---|---|
| 5,389,824 A * | 2/1995 | Moroto et al. ............... 307/10.1 |
| 5,547,216 A | 8/1996 | Iwata et al. | |
| 5,565,711 A * | 10/1996 | Hagiwara ..................... 307/10.1 |
| 5,757,150 A | 5/1998 | Kinoshita et al. | |
| 5,793,121 A * | 8/1998 | Burgess ....................... 307/10.1 |
| 5,816,358 A * | 10/1998 | Adler et al. ................... 180/279 |
| 5,818,121 A * | 10/1998 | Krappel et al. ............... 307/10.7 |
| 6,325,171 B1 * | 12/2001 | Masunari et al. ............. 180/279 |
| 7,614,651 B2 * | 11/2009 | Uchida ......................... 280/735 |
| 2002/0195920 A1 * | 12/2002 | Furusawa et al. ............. 313/402 |
| 2006/0137929 A1 | 6/2006 | Yoshida | |
| 2008/0271942 A1 | 11/2008 | Yamashita et al. | |

FOREIGN PATENT DOCUMENTS

| | | |
|---|---|---|
| JP | 6055992 A | 3/1994 |
| JP | 6245323 A | 9/1994 |
| JP | 7059202 A | 3/1995 |

(Continued)

OTHER PUBLICATIONS

Japanese Notice of Grounds for Rejection with English translation; Nov. 30, 2010.

(Continued)

*Primary Examiner* — Ruth Ilan
(74) *Attorney, Agent, or Firm* — Gifford, Krass, Sprinkle, Anderson & Citkowski, P.C.

(57) ABSTRACT

A control apparatus comprises an SMR for switching supply of power on and off from a high voltage battery to an inverter, a switching command section for commanding the SMR to switch supply of power from the high voltage battery, a collision detection section for detecting a collision from outside the inverter, and a collision determination section for determining a collision with the inverter on the basis of at least detection by the collision detection section. The collision detection section includes a load detection sensor for detecting a load from outside the inverter and the switching command section commands the SMR to stop supply of power from the high voltage battery on the basis of collision determination by the collision determination section.

9 Claims, 6 Drawing Sheets

FOREIGN PATENT DOCUMENTS

| | | |
|---|---|---|
| JP | 7242153 A | 9/1995 |
| JP | 2001-108539 | 4/2001 |
| JP | 2001 174340 A | 6/2001 |
| JP | 2001239875 A | 9/2001 |
| JP | 2006182300 A | 7/2006 |
| JP | 2007001539 A | 1/2007 |
| JP | 2007137276 A | 6/2007 |
| JP | 2007-335184 A | 12/2007 |
| JP | 2008154315 A | 7/2008 |

OTHER PUBLICATIONS

Office Action from Japanese Application No. 2000-321293 dated Mar. 15, 2011; 4 pgs.

Office Action from corresponding Chinese Application No. 200910168407.4 dated Aug. 16, 2011; 8 pgs.

* cited by examiner

CONTROL APPARATUS AND CONTROL METHOD FOR HIGH VOLTAGE POWER SUPPLY CIRCUIT AND VEHICLE PROVIDED WITH CONTROL APPARATUS

PRIORITY INFORMATION

This application claims priority to Japanese Patent Application Nos. 2008-215140 filed on Aug. 25, 2008 and 2008-321293 filed on Dec. 17, 2008, which are incorporated herein by reference in their entireties.

TECHNICAL FIELD

The present invention relates to a control apparatus and a control method for a high voltage power supply circuit and more particularly to a control apparatus and a control method for a high voltage power supply circuit for supplying power from a high voltage power supply to an electronic device and to a vehicle provided with the control apparatus.

BACKGROUND ART

Vehicle control systems for performing predetermined control operations on the basis of collision detection are known.

JP 6-245323 A discloses a technique for detecting a collision by a G sensor installed in an electric vehicle and stopping electric power generation by an engine driven generator.

JP 7-242153 A discloses the actuation of a side collision airbag on the basis of load detection by a pressure sensor.

JP 6-55992 A discloses a collision sensor for an airbag apparatus deforming from pressure greater than or equal to a predetermined amount and covered by a pressure plate compressing a switch.

JP 2006-182300 A discloses a collision safety system for determining a collision on the basis of collision detection from at least two collision detecting means.

JP 7-59202 A discloses a technique for releasing a connection between an inverter and a battery due to a collision, such as a vehicle collision.

JP 2001-174340 A discloses the use of a touch sensor having the periphery of electrodes covered by an elastic conductor as a load detection sensor for detecting a load by deformation of the conductor.

JP 2001-239875 A discloses a technique for detecting a seated load by deforming a bracket, to which a load sensor is attached, according to the extent of seat weight.

In a vehicle, such as a hybrid vehicle, operated by supply of power from a high voltage power supply and installed with an electronic device, such as an inverter, a control system for releasing the connection of the high voltage power supply circuit upon detection of a collision is generally built into an electrically connectible circuit (high voltage power supply circuit) between the high voltage power supply and the electronic device. As a control mechanism for this control system, a method for recognizing a collision on the basis of collision detection by a G sensor and according to necessity a safing signal from a separate collision detection sensor, such as of an airbag system, and for stopping supply of power from the high voltage power supply is widely used.

However, when determining the control of the high voltage power supply circuit by the G sensor, the technique for setting the installation location and threshold (sensitivity) of the G sensor was difficult. Furthermore, a more appropriate collision detection technique instead of the G sensor may also be desirable depending on the positional relationship between the colliding object and the vehicle, such as due to various arrangements of the installed electronic device.

SUMMARY OF THE INVENTION

One aspect of the present invention is a control apparatus for controlling a high voltage power supply circuit to supply power from a high voltage power supply to an electronic device comprises a supply switching unit for switching supply of power on and off from the high voltage power supply to the electronic device, a switching command unit for commanding the supply switching unit to switch supply of power from the high voltage power supply, a collision detecting unit for detecting a collision from outside the electronic device, and a collision determining unit for determining a collision with the electronic device on the basis of at least detection by the collision detecting unit, where the collision detecting unit includes a load detection sensor for detecting a load from outside the electronic device and the switching command unit for commanding the supply switching unit to stop supply of power from the high voltage power supply on the basis of collision determination by the collision determining unit.

Another aspect of the present invention is a method for controlling supply of power to a high voltage power supply circuit to supply power from a high voltage power supply to an electronic device comprising a step for detecting a load from outside the electronic device, a step for determining a collision from outside the electronic device on the basis of at least detection of load, and a step for stopping supply of power from the high voltage power supply on the basis of collision determination.

BRIEF DESCRIPTION OF THE DRAWINGS

Exemplary embodiments of the present invention will be described in detail with reference to the following figures, wherein.

DESCRIPTION OF THE EMBODIMENTS

Figure 1:
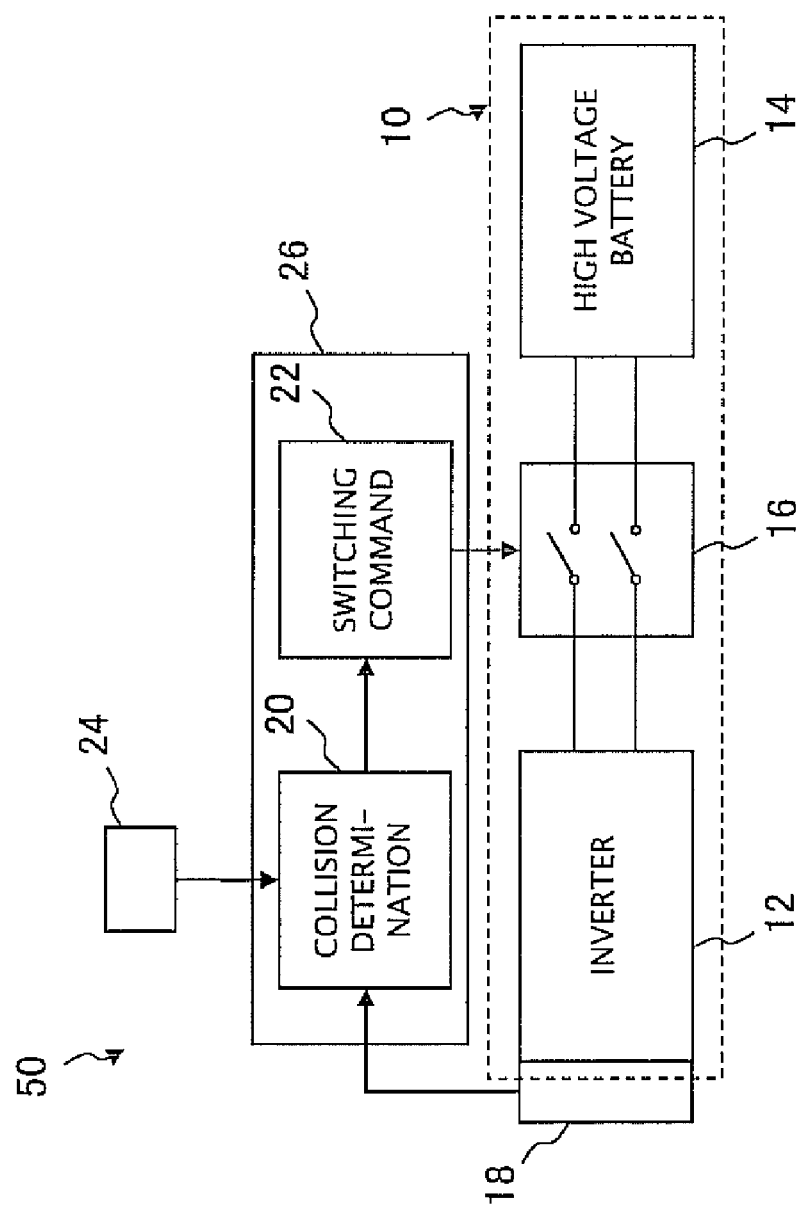
FIG. 1 is a block diagram illustrating a configuration of a control apparatus for a high voltage power supply circuit in an embodiment of the present invention.

Embodiments of the present invention will be described with reference to the attached drawings. The same reference numerals have been applied to like parts and their descriptions are omitted.

FIG. 1 is a block diagram illustrating the major parts of a control apparatus for a high voltage power supply circuit in an embodiment of the present invention. A high voltage power supply circuit 10 shown in FIG. 1 includes an inverter 12 and a high voltage battery 14, both of which are electrically connectible via a system main relay (SMR) 16. The system main relay (SMR) 16 assumes the role of supply switching means for switching the supply of power on and off to the inverter 12 from the high voltage battery 14. Furthermore, the inverter 12 is generally configured so as to be housed or mounted within an insulated case so that the electronic circuitry (inverter circuit), which is not shown, is not exposed to the outside and to ensure a predetermined mechanical strength and insulation performance. The inverter 12 may be further electrically connected to a motor (not shown) as a power source.

On the other hand, a control apparatus 50 for the high voltage power supply circuit of the present invention includes a collision detector 18 for detecting a collision from outside the inverter 12, a collision determination section 20 for determining a collision with the inverter 12, and an electronic control unit (ECU) 26 including a switching command section 22 for commanding the SMR 16 to switch the supply of power from the high voltage battery 14.

The collision detector 18 in FIG. 1 detects a collision with the inverter 12. When a collision is detected by the collision detector 18, the collision determination section 20 is notified. Next, the collision is determined at the collision determination section 20 on the basis of collision detection at the collision detector 18. At this time, it is preferable to improve the accuracy of the collision determination as necessary by using in combination a collision detection signal from a collision detector 24 separate from the collision detector 18, such as a safing sensor of an airbag system. In the embodiment, the collision determination section 20 can realize a more accurate collision determination by determining a collision on the basis of collision detection from the collision detectors 18 and 24 and eliminating the possibility that one of the collision detectors may malfunction.

Furthermore, the switching command section 22 commands the SMR 16 to control the disconnection of supply of power from the high voltage battery 14 on the basis of collision determination at the collision determination section 20. Then, the SMR 16 performs switching control for releasing the electrical connection on the basis of the switching command from the switching command section 22 and the supply of power from the high voltage battery 14 to the inverter 12 is disconnected.

In the embodiment, the collision detector 18 shown in FIG. 1 is configured to include a load detection sensor for detecting a load from outside the inverter 12. Hereinafter, a technique for detecting a collision by the collision detector 18 including the load detection sensor will be described.

Figure 2:
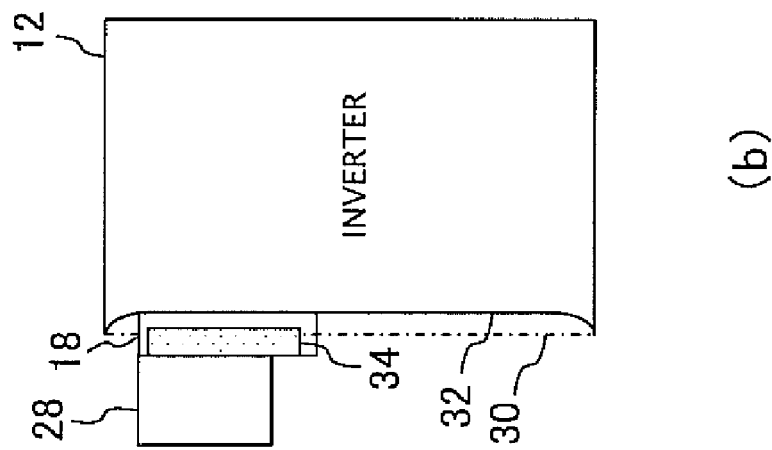
FIG. 2 illustrates an example of a technique for detecting a collision in the embodiment of the present invention.
Figure 2:
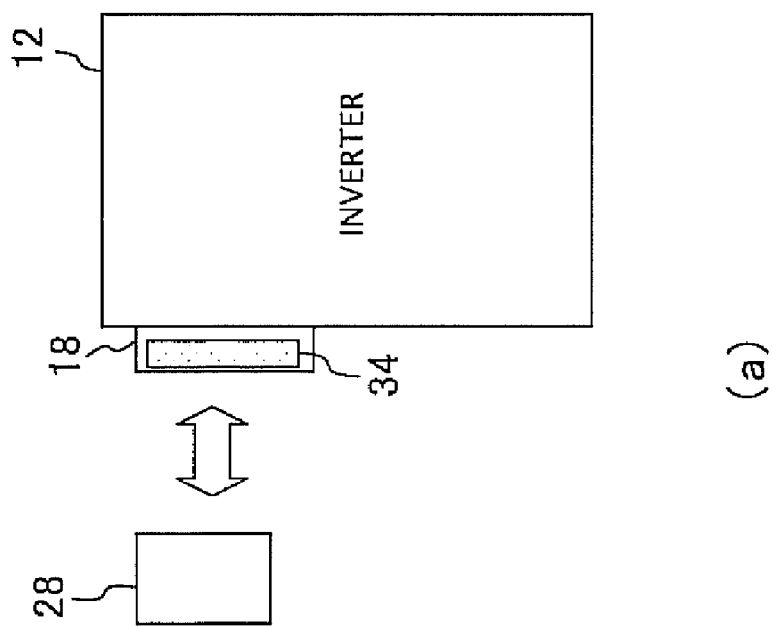

FIG. 2 illustrates an example of a technique for detecting a collision using a load detection sensor in an embodiment of the present invention. In the embodiment, a load sensor 34 is provided as a load detection sensor included in the collision detector 18 and has a configuration capable of detecting a collision with the inverter 12 from outside by sensing displacement or distortion accompanying a predetermined pressure by a colliding object (body). For the load sensor 34 having this configuration, a commercially available load sensor called a load cell, for example, or another load detection sensor exhibiting the same function can be applied.

As shown in FIG. 2, when a member or part thereof near the inverter 12 or an object 28 from outside moves relatively toward the inverter 12, the object 28 first contacts the collision detector 18 provided outside the inverter 12 and a load from the object 28 is detected by the load sensor 34 (refer to the left side of the arrow in FIG. 2). At this time, the load detected by the load sensor 34 can be regarded as the load received (or likely to be immediately received) by the inverter 12 (more specifically, the case housing the inverter 12). Thereafter, as shown on the right side of the arrow in FIG. 2, when the case forming the enclosure of the inverter 12 is not able to withstand the load from the object 28, a part thereof deforms (for example, 30 to 32), and when the load is further continuously received, the case becomes damaged in some instances and the inside of the inverter 12 becomes exposed. At this time, the load detected by the load sensor 34 changes upon collision with the object 28, such as in the manner shown in curve C of FIG. 3. Inflection point A on the curve shows that destruction of the case has occurred. Namely, by monitoring the state of change of the load detected by the load sensor 34, a collision from outside the inverter 12 can be detected.

Figure 3:
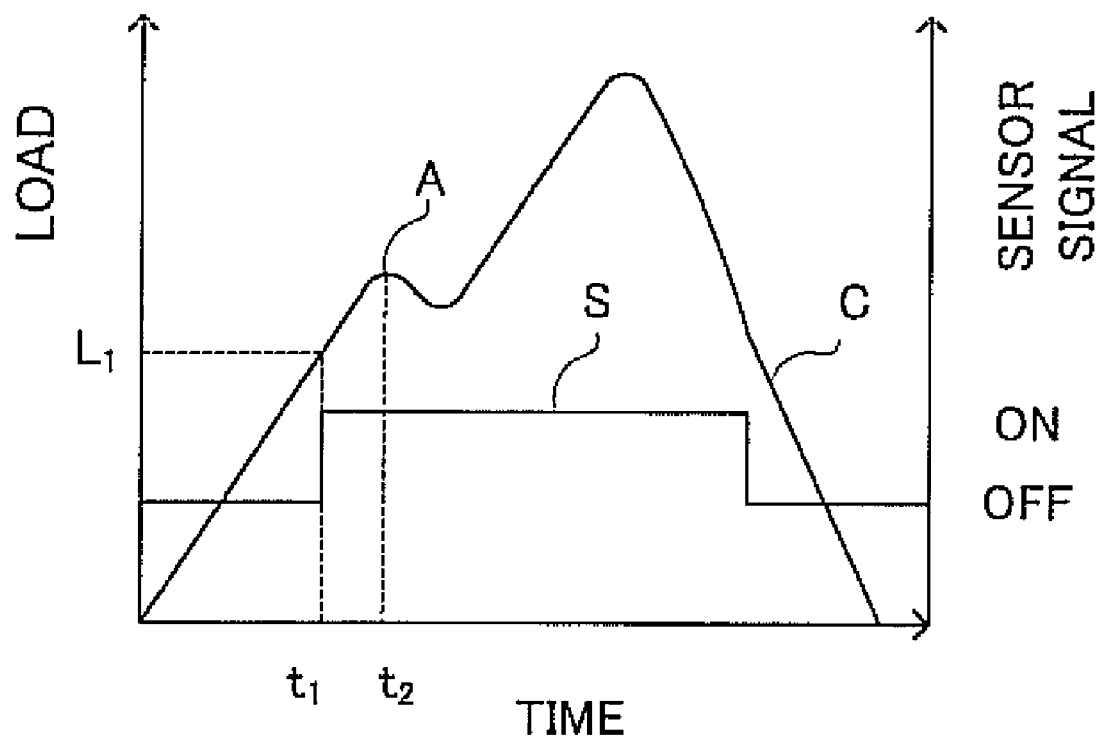
FIG. 3 illustrates an example of load change and collision notification timing.

FIG. 3 illustrates an example of the change in load detected by the collision detector 18 shown in FIG. 1 (or more specifically, the load sensor 34 shown in FIG. 2) and the timing of collision notification based on sensor signal input to the collision determination section 20. As shown in FIG. 3, upon collision with inverter 12 on the side where the collision detector 18 has been installed, the load received by the collision detector 18 rises as illustrated by load curve C with the elapse of time. Finally, at time $t_1$ where the load curve C exceeds a predetermined threshold $L_1$ set in advance, the collision determination section 20 shown in FIG. 1 is notified of the occurrence of the collision with the inverter 12 (namely, the output of sensor signal S is turned on). Furthermore, in another embodiment, instead of the setting of the threshold $L_1$, it is also possible to issue a notification of the occurrence of the collision when the rate (slope) of pressure rise within a case rapidly rises to exceed an allowable predetermined range or at a time $t_2$ where the load rise rapidly changes to a load drop at inflection point A (namely, the case becomes damaged).

In this manner, according to the embodiment, it becomes possible to stop the supply of power from the high voltage battery at least before the internal circuitry of the inverter is exposed.

Figure 4A:
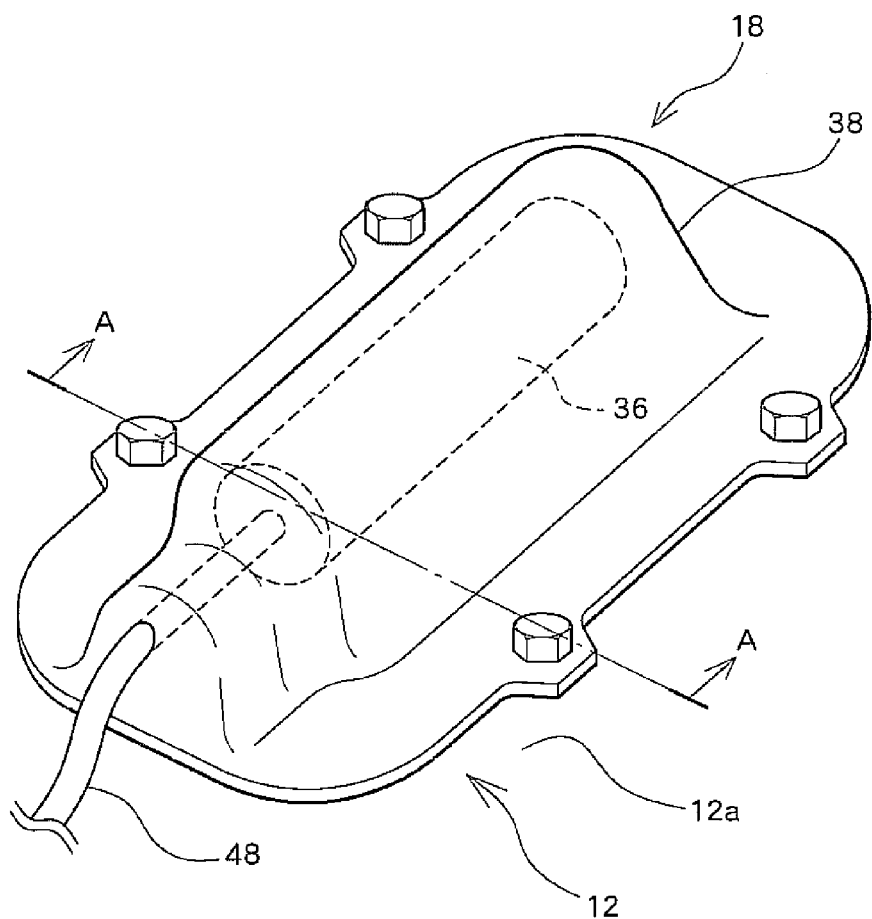
FIG. 4A illustrates another example of a technique for detecting a collision in the embodiment of the present invention.
Figure 4B:
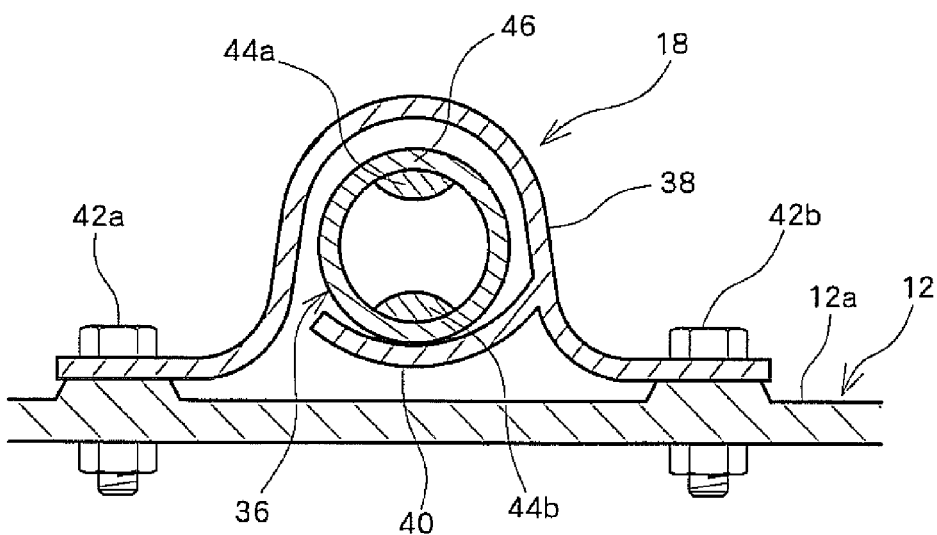
FIG. 4B illustrates another example of a technique for detecting a collision in the embodiment of the present invention.

FIG. 4A and FIG. 4B illustrate another example of a method for detecting a collision using a load detection sensor in an embodiment of the present invention. FIG. 4A is an enlarged perspective view of major parts of the collision detector 18 in the embodiment and FIG. 4B is a sectional view of A-A illustrating an example configuration of the collision detector 18 shown in FIG. 4A.

As shown in FIG. 4A, a pressure sensitive sensor 36 having a cylindrical shape and included in the collision detector 18 is provided as a load detection sensor in the embodiment. The pressure sensitive sensor 36 has its periphery covered by a bracket 38 for fixing the pressure sensitive sensor 36 to a case surface 12a to house the inverter 12. Furthermore, as shown in FIG. 4B, the bracket 38 is fixed to the case surface 12a of the inverter 12 via fastener parts 42, such as bolts and nuts. At this time, a retainer 40 or a plurality thereof as necessary, integrated with or separate from the bracket 38, is provided to the inner part of the bracket 38 facing the case surface 12a of the inverter 12 to retain the pressure sensitive sensor 36 in an appropriate position.

As shown in FIG. 4B, the pressure sensitive sensor 36 has a configuration covering the periphery of electrodes 44a and 44b, which face each other at a predetermined interval, with an elastic insulator 46 including rubber or other flexible material. When the pressure sensitive sensor 36 receives a load from outside exceeding a predetermined magnitude, deformation of the elastic insulator 46 causes contact and conduction between the electrodes 44a and 44b so that the load can be detected. Thus, the pressure sensitive sensor 36 senses via the bracket 38 a pressing force exceeding a predetermined load from a colliding object (body) so that it is possible to detect a collision from outside the inverter 12 and notify the collision determination section (not shown here, refer to FIG. 1) via a wire harness 48.

Figure 5:
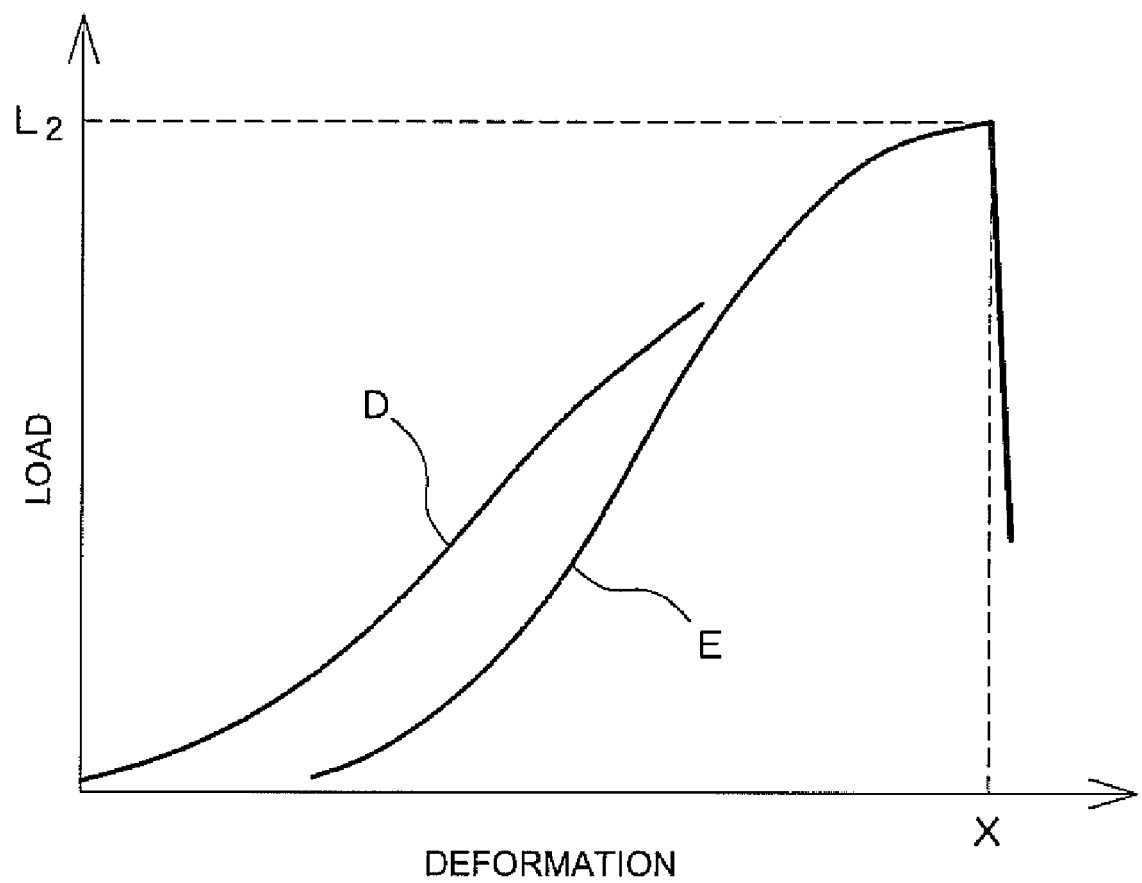
FIG. 5 illustrates an example of a relationship between extent of deformation and load received from outside.

FIG. 5 illustrates an example of the relationship between the magnitude of deformation of the collision detector 18 shown in FIG. 4A and FIG. 4B and the load received from outside. When a member or part thereof near the inverter 12 or an object from outside moves relatively toward the inverter 12, the object first contacts the bracket 38 provided to cover the pressure sensitive sensor 36 and the bracket 38 deforms as shown by curve D. On the other hand, the inverter 12, or more specifically the case housing the inverter 12, is configured from a material more rigid than the bracket 38 so that deformation begins after a delay from deformation of the bracket 38 as shown by curve E and damage occurs when load $L_2$ is received and deformation reaches x. Thus, by adjusting the material and thickness of the bracket 38 and the spacing between the bracket 38 and the pressure sensitive sensor 36 so that the pressure sensitive sensor 36 detects a load at least before the case housing the inverter 12 receives load $L_2$, it becomes possible to stop the supply of power from the high voltage battery at least before the internal circuitry of the inverter is exposed. This is preferable since it is not necessary to adjust the sensitivity of the pressure sensitive sensor 36 at this time in accordance with the strength of the case housing the inverter 12.

Having a configuration for the above-mentioned load detection, the pressure sensitive sensor 36 shown in FIG. 4A and FIG. 4B is also called a "touch sensor." The shape of the pressure sensitive sensor 36 can adopt an appropriate shape, such as of a cable, cord, tape, and so forth, in accordance with the shape or construction of the inverter 12. According to the embodiment, a simple pressure sensitive sensor having only an on-off function in accordance with the presence or absence of a load from outside greater than or equal to a predetermined extent can be utilized as a load detection sensor. A load detection sensor to be applied in the embodiment is not limited to the configuration of the pressure sensitive sensor 36 shown in FIG. 4A and FIG. 4B, provided a load detection sensor demonstrating similar action can be applied.

For the bracket 38 in the embodiment shown in FIG. 4A and FIG. 4B, any material satisfying the required strength, such as a steel plate in which steel having a desired hardness is machined into a plate, can be machined and formed for use as the bracket 38. As described above, it is preferable to set the strength of the bracket 38 to be somewhat lower than the strength of the case housing the inverter 12. Taking into consideration variations in the strength of the bracket 38 to be fabricated, the strength of the bracket 38 can be set so that the pressure sensitive sensor 36 detects a collision as the bracket 38 deforms at a load approximately 80% to 90% of the load causing deformation and damage to the case housing the inverter 12. Furthermore, to prevent or inhibit at least human-induced malfunctions, it is preferable to adjust the strength of the bracket 38 so that the pressure sensitive sensor 36 is not actuated, for example, at 200 kgf (approximately 1.9 kN) or less, or more preferably at 100 kgf (approximately 0.98 kN) or less.

In this manner, according to the embodiment, it becomes possible to stop the supply of power from the high voltage battery at least before the internal circuitry of the inverter is exposed. Furthermore, since the bracket is a member for fixing the pressure sensitive sensor, an increase in the number of parts can be curbed. Moreover, since the sensitivity of collision detection by the collision detector can be adjusted simply by changing the bracket, it is possible to arrange the bracket on the case surface of an inverter having varying shapes or strengths without changing the load detection sensor.

Next, an example of a vehicle installed with a control apparatus for the high voltage power supply circuit in an embodiment of the present invention will be described.

Figure 6:
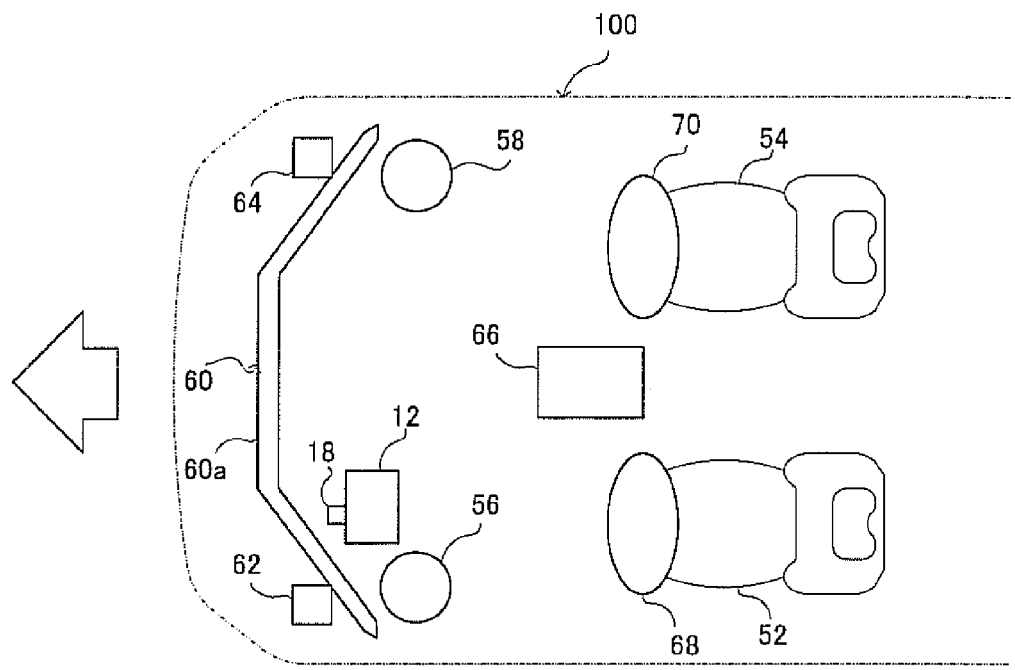
FIG. 6 is a top schematic diagram illustrating an overview of the vehicle configuration in an embodiment of the present invention.
Figure 7:
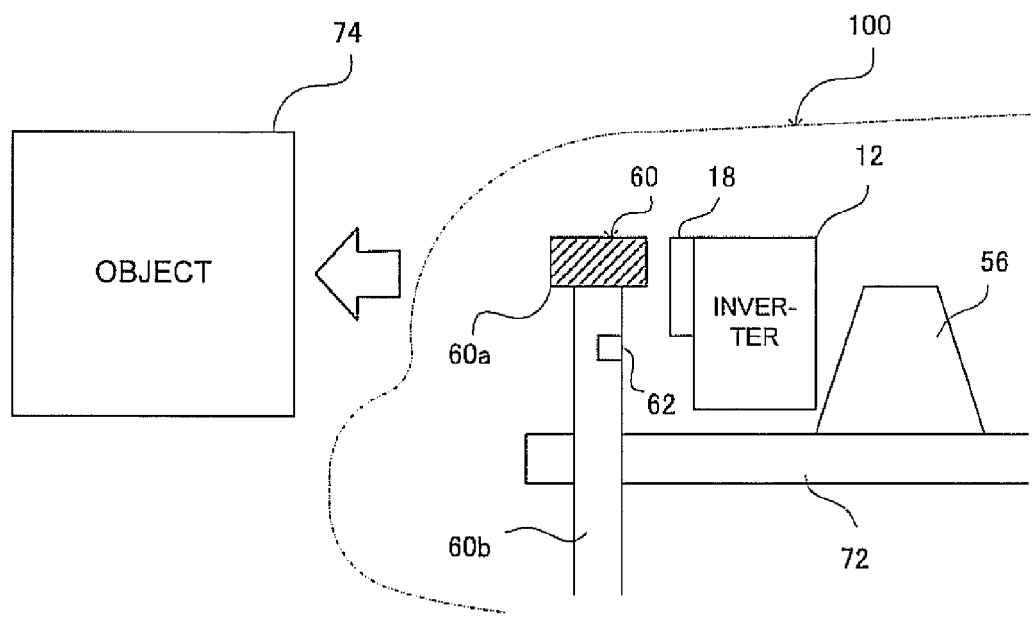
FIG. 7 is a side schematic diagram, particularly enlarging the front portion of the vehicle shown in FIG. 6.

FIG. 6 and FIG. 7 are schematic diagrams illustrating an overall configuration of the major parts of a vehicle installed with the control apparatus for the high voltage power supply circuit in the embodiment of the present invention. FIG. 6 shows a top view and FIG. 7 shows a left side view of the vehicle and especially corresponds to a further enlarged view of the front side of the vehicle shown in FIG. 6. Although the same members are shown in FIG. 6 and FIG. 7, the shapes and dimensions shown do not necessarily match. Furthermore, the arrangement of high voltage battery 14 and the electronic control unit (ECU) 26 shown in FIG. 1 and wiring between members have been omitted.

A radiator support 60 for supporting a radiator (not shown) and suspension towers 56 and 58 for housing suspension springs (not shown) are provided on the front side of a vehicle 100 moving toward the left in FIG. 6.

The inverter 12 is arranged between the first suspension tower 56, which is arranged in front of a first front seat 52, and the radiator support 60. Furthermore, the collision detector 18 is provided in front of the inverter 12 so as to face the first suspension tower 56. Although fixing of the collision detector 18 to the inverter 12 can be performed, for example, via the above-mentioned bracket and other fastening members, any other known method may be used, for example, via an adhesive having a predetermined heat resistance.

In front of the front seats 52 and 54 forming the driver's seat and front passenger seat are provided SRS airbags 68 and 70 for protection from impact during a collision. The SRS airbags 68 and 70 are configured, for example, so as to be actuated on the basis of outputs of collision detection signals from front airbag sensors 62 and 64 and collision detection signals from a center airbag sensor 66. In another embodiment, it is possible to additionally provide another passenger collision safety apparatus, such as a side airbag (not shown) outside the front seats 52 and 54 for softening a collision of the vehicle 100 from the side. Furthermore, in some instances, one of the SRS airbags 68 and 70, more specifically, only the SRS airbag on the driver's seat side is installed and the SRS airbag on the front passenger seat side is not installed.

Referring to FIG. 7, the suspension tower 56 is fixed above a side member 72 connected with a body part (not shown) of the vehicle 100 extending on the side portion of the vehicle body. Furthermore, the radiator support 60 includes an upper radiator support 60a defining the shape of the top part and a side radiator support 60b defining the shape of the side part. In the embodiment, the inverter 12 is arranged so as to have substantially the same height as the upper radiator support 60a within the vehicle 100 and further the first front airbag sensor 62 is provided adjacent to the side radiator support 60b.

In FIG. 7, when the vehicle 100 collides with an object 74, the radiator support 60 arranged at the front part of the vehicle 100 deforms. Upon deformation of the radiator support 60, when the upper radiator support 60a moves relatively toward the inverter 12, it is assumed the upper radiator support 60a and the inverter 12 collide and the case housing the inverter 12 becomes damaged. As shown in FIG. 6 and FIG. 7, the collision detector 18 is arranged between the inverter 12 and the radiator support 60 on the inverter 12 surface on the side facing the radiator support 60 so as to have substantially the same height as the upper radiator support 60*a*. At this time, before the inverter 12 becomes damaged from the collision with the upper radiator support 60*a*, the collision detector 18 detects a load from the upper radiator support 60*a* and the supply of power from a high voltage battery (not shown) can be stopped. To prevent an erroneous collision determination due to malfunction of the collision detector 18, it is preferable to have a configuration for utilizing the presence or absence of output of the collision detection signal from the SRS airbag system described above and stopping the supply of power from the high voltage battery (not shown) only when this collision detection signal is output in combination.

In the embodiment shown in FIG. 6 and FIG. 7, the collision detector 18 is arranged on the vehicle front side of the inverter 12, on the upper radiator support 60*a* side that can become the object 28 (refer to FIG. 2) damaging the inverter 12 from a collision between the vehicle 100 and the object 74. However, the collision detector 18 can be arranged at another location depending on the arrangement of the inverter 12 and further it is also preferable to install a plurality of collision detectors 18 in another embodiment. Furthermore, as another embodiment, if the inverter 12 is arranged to the rear of the suspension tower 56 shown in FIG. 7, for example, the collision detector 18 can be arranged at a location facing the suspension tower 56 on the vehicle front side of the inverter 12.

According to an embodiment of the present invention, appropriate control of a high voltage power supply circuit can be performed.

In the above-mentioned embodiments, although the inverter was illustrated as an electronic device connectible to the high voltage power supply circuit, it is possible to preferably utilize another electronic device. Furthermore, the "high voltage" herein relating to automobiles in general refers to 60 V or higher but is also applicable to power supply circuits having lower voltages.

While there has been described what are at present considered to be preferred embodiments of the invention, it will be understood that various modifications may be made thereto, and it is intended that the appended claims cover all such modifications as fall within the true spirit and scope of the invention.

The invention claimed is:

1. A control apparatus for controlling a high voltage power supply circuit to supply power from a high voltage power supply to an electronic device, said control apparatus comprising:
 a supply switching unit for switching supply of power on and off from said high voltage power supply to said electronic device;
 a switching command unit for commanding said supply switching unit to switch supply of power from said high voltage power supply;
 a collision detecting unit for detecting a collision from outside said electronic device; and
 a collision determining unit for determining a collision with said electronic device on the basis of at least detection by said collision detecting unit; wherein
 said collision detecting unit includes a pressure sensitive sensor for detecting a load from outside said electronic device and conducting power, and a bracket formed with a steel plate, covering a periphery of said pressure sensitive sensor, for fixing said pressure sensitive sensor to a surface of a case to house said electronic device;
 said pressure sensitive sensor includes a pair of electrodes facing each other at a predetermined interval so as to contact each other and conduct power when receiving an excessive load;
 said collision determining unit determines a collision by contact and conduction between said electrodes of said pressure sensitive sensor caused by a load through said bracket; and
 said switching command unit commands said supply switching unit to stop supply of power from said high voltage power supply on the basis of collision determination by said collision determining unit.

2. The control apparatus according to claim 1, wherein said electronic device is an inverter mounted in a vehicle and said pressure sensitive sensor is disposed on the front side of said inverter.

3. A method for controlling supply of power to a high voltage power supply circuit to supply power from a high voltage power supply to an electronic device comprising the steps of:
 detecting a load from outside said electronic device by a pressure sensitive sensor for detecting the load from outside said electronic device and conducting power, the pressure sensitive sensor including a pair of electrodes facing each other at a predetermined interval so as to contact each other and conduct power when receiving an excessive load, a periphery of said pressure sensitive sensor being covered with a bracket formed with a steel plate, for fixing said pressure sensitive sensor to a surface of a case to house said electronic device;
 determining a collision from outside said electronic device by at least contact and conduction between said electrodes of said pressure sensitive sensor caused by a load through said bracket; and
 stopping supply of power from said high voltage power supply on the basis of collision determination.

4. The method according to claim 3, wherein said electronic device is an inverter mounted in a vehicle.

5. A vehicle comprising:
 a high voltage power supply;
 an electronic device electrically connectible to said high voltage power supply;
 a supply switching unit for switching supply of power on and off from said high voltage power supply to said electronic device;
 a switching command unit for commanding said supply switching unit to switch supply of power from said high voltage power supply;
 a collision detecting unit for detecting a collision from outside said electronic device; and
 a collision determining unit for determining a collision with said electronic device on the basis of at least detection by said collision detecting unit; wherein
 said collision detecting unit includes a pressure sensitive sensor for detecting a load from outside said electronic device and conducting power, and a bracket formed with a steel plate, covering a periphery of said pressure sensitive sensor, for fixing said pressure sensitive sensor to a surface of a case to house said electronic device;
 said pressure sensitive sensor includes a pair of electrodes facing each other at a predetermined interval so as to contact each other and conduct power when receiving an excessive load;
 said collision determining unit determines a collision by contact and conduction between said electrodes of said pressure sensitive sensor caused by a load through said bracket; and said switching command unit commands said supply switching unit to stop supply of power from said high voltage power supply on the basis of collision determination by said collision determining unit.

6. The vehicle according to claim 5, wherein said electronic device is an inverter.

7. A vehicle comprising:
a high voltage power supply;
an electronic device electrically connectible to said high voltage power supply;
a supply switching unit for switching supply of power on and off from said high voltage power supply to said electronic device;
a switching command unit for commanding said supply switching unit to switch supply of power from said high voltage power supply;
a collision detecting unit for detecting a collision from outside said electronic device;
a collision determining unit for determining a collision with said electronic device on the basis of at least detection by said collision detecting unit; and
an upper radiator support, wherein
said electronic device is an inverter;
said collision detecting unit includes a load detection sensor, disposed between said inverter and said upper radiator support, for detecting a load from outside said inverter; and
said switching command unit commands said supply switching unit to stop supply of power from said high voltage power supply on the basis of collision determination by said collision determining unit.

8. The vehicle according to claim 7, wherein said load detection sensor includes a load cell or a touch sensor.

9. A vehicle comprising:
an upper radiator support;
a high voltage power supply;
an inverter electrically connectible to said high voltage power supply;
a supply switching unit for switching supply of power on and off from said high voltage power supply to said inverter;
a switching command unit for commanding said supply switching unit to switch supply of power from said high voltage power supply;
a collision detecting unit for detecting a collision from outside said inverter; and
a collision determining unit for determining a collision with said inverter on the basis of at least detection by said collision detecting unit; wherein
said collision detecting unit includes a pressure sensitive sensor for detecting a load from outside said inverter and conducting power, and a bracket, covering a periphery of said pressure sensitive sensor, for fixing said pressure sensitive sensor to a surface of a case to house said inverter, said pressure sensitive sensor is disposed between said inverter and said upper radiator support;
said pressure sensitive sensor includes a pair of electrodes facing each other at a predetermined interval so as to contact each other and conduct power when receiving an excessive load;
said collision determining unit determines a collision by contact and conduction between said electrodes of said pressure sensitive sensor caused by a load through said bracket; and said switching command unit commands said supply switching unit to stop supply of power from said high voltage power supply on the basis of collision determination by said collision determining unit.

* * * * *